(No Model.)  5 Sheets—Sheet 1.

F. H. RICHARDS.
ENVELOPE MACHINE.

No. 340,244. Patented Apr. 20, 1886.

Witnesses:
C. O. Palmer.
H. F. L. Orcutt.

Inventor:
Francis H. Richards.

N. PETERS. Photo-Lithographer, Washington, D. C.

(No Model.)  
F. H. RICHARDS.  
ENVELOPE MACHINE.

No. 340,244. Patented Apr. 20, 1886.

Witnesses:  
C. O. Palmer.  
H. F. L. Orcutt.

Inventor  
Francis H. Richards (No Model.) 5 Sheets—Sheet 3.

F. H. RICHARDS.
ENVELOPE MACHINE.

No. 340,244. Patented Apr. 20, 1886.

Witnesses:
C. O. Palmer.
H. F. L. Orcutt.

Inventor.
Francis H. Richards.

(No Model.)  
5 Sheets—Sheet 4.

F. H. RICHARDS.
ENVELOPE MACHINE.

No. 340,244. Patented Apr. 20, 1886.

Witnesses:  
C. O. Palmer.  
H. F. L. Orcutt.

Inventor.  
Francis H. Richards.

(No Model.) 5 Sheets—Sheet 5.

F. H. RICHARDS.
ENVELOPE MACHINE.

No. 340,244. Patented Apr. 20, 1886.

Witnesses:
H. F. Orcutt.
C. O. Palmer.

Inventor.
Francis H. Richards.

UNITED STATES PATENT OFFICE.

FRANCIS H. RICHARDS, OF SPRINGFIELD, MASS., ASSIGNOR OF ONE-HALF TO THE PRATT & WHITNEY COMPANY, OF HARTFORD, CONN.

ENVELOPE-MACHINE.

SPECIFICATION forming part of Letters Patent No. 340,244, dated April 20, 1886.

Application filed April 30, 1884. Serial No. 129,850. (No model.)

*To all whom it may concern:*

Be it known that I, FRANCIS H. RICHARDS, a citizen of the United States, residing at Springfield, in the county of Hampden, State of Massachusetts, have invented a new and useful Improvement in Envelope-Machines, of which the following is a specification, reference being had to the accompanying five sheets of drawings, forming a part thereof.

This invention relates to that class of envelope-machines which are adapted to take envelope-blanks, previously cut to the required shape and suitably placed in a pile in the machine, and to gum, fold, and deliver them completed, ready to be packed for use.

The invention consists in certain combinations of mechanism, which will first be described in connection with the drawings, and afterward pointed out in the claims.

Figure 1:
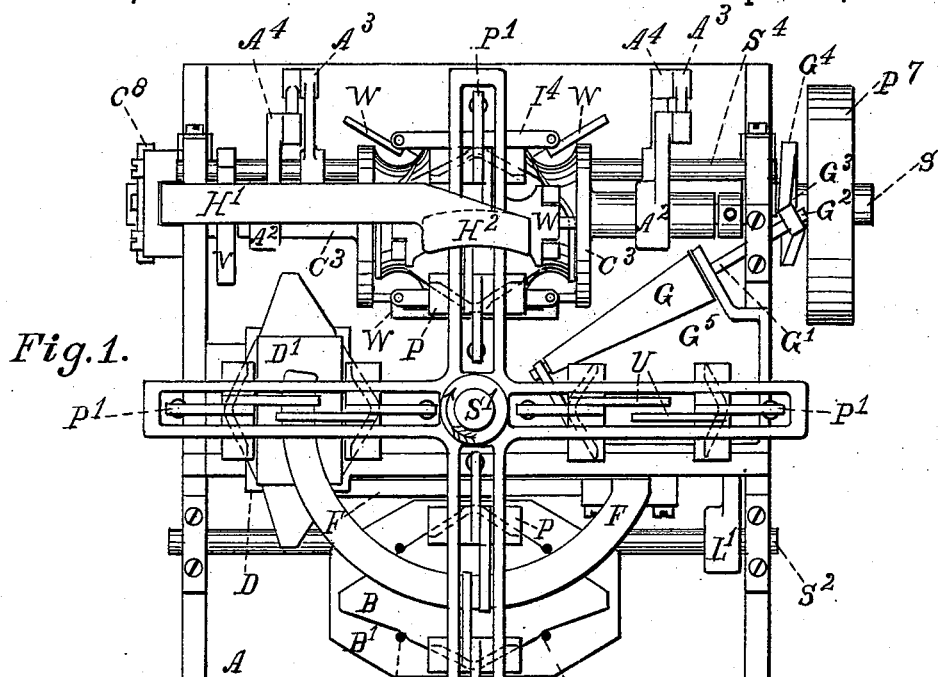
Figure 2:
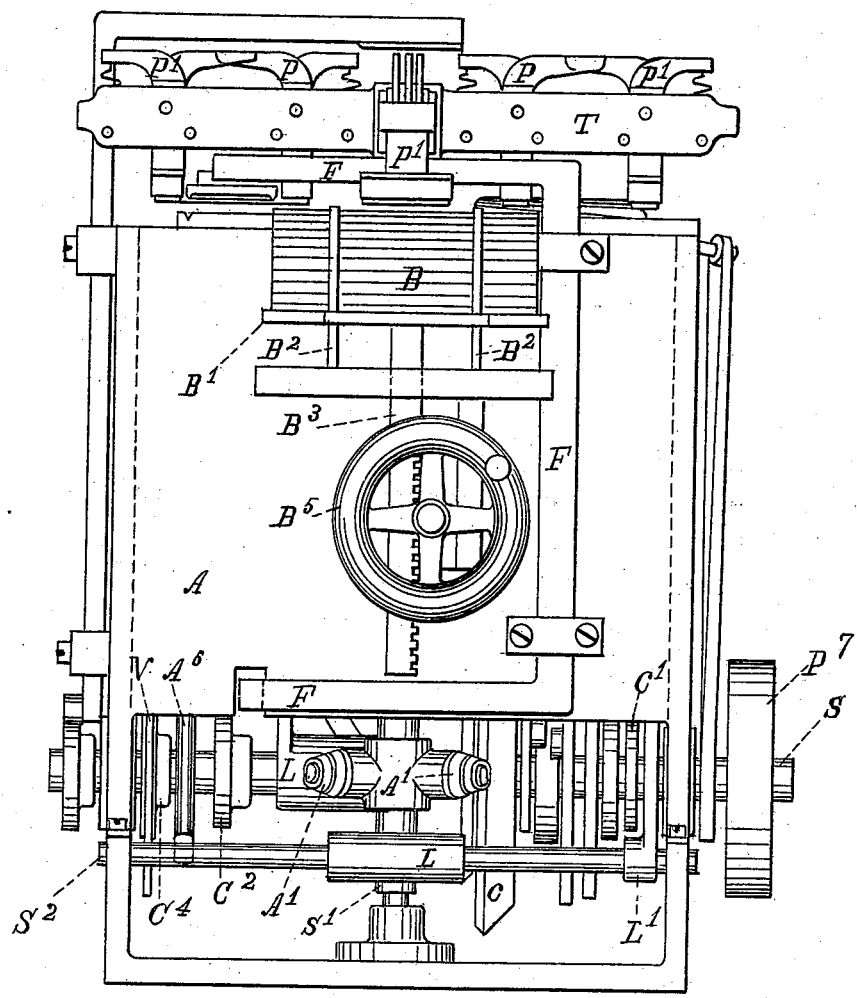
Figure 3:
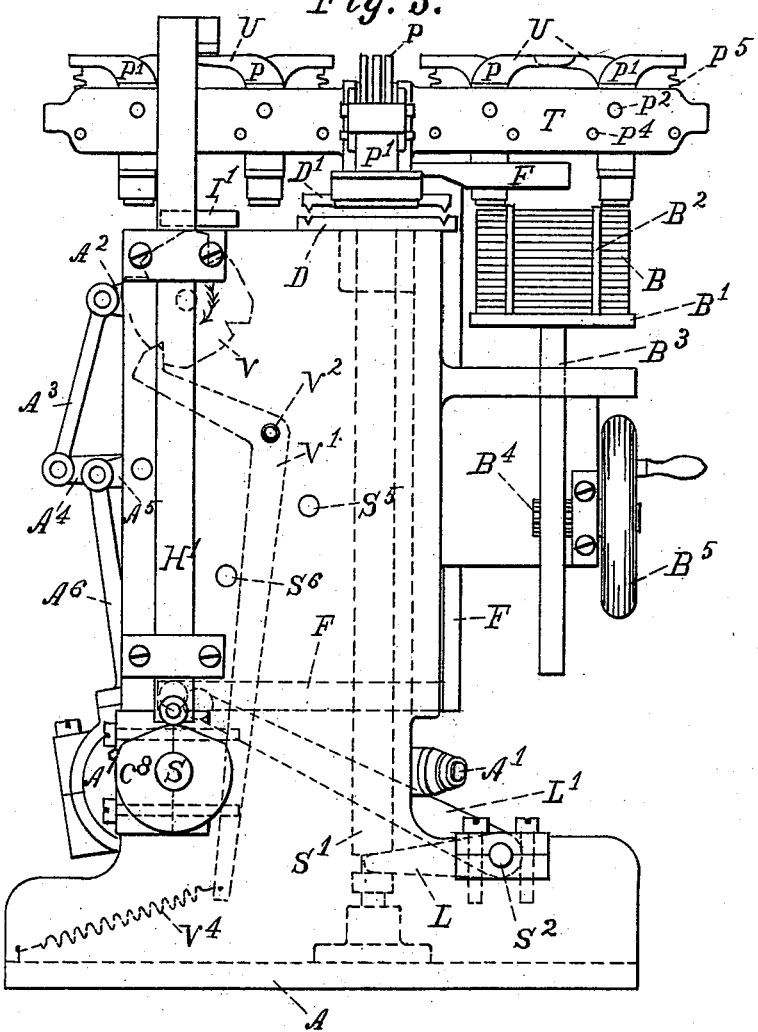
Figure 15:
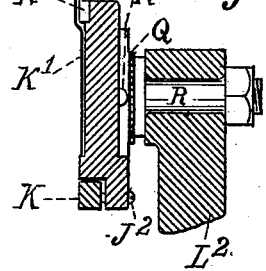
Figure 14:
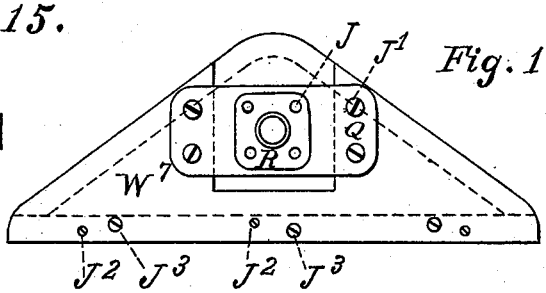
Figure 5:
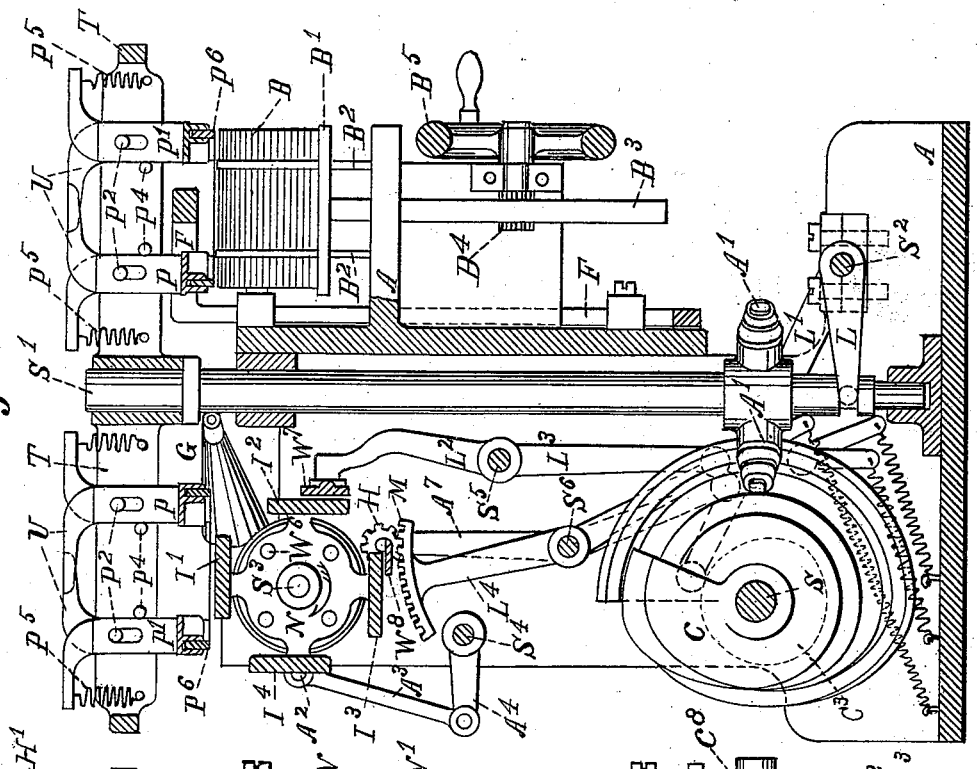
Figure 4:
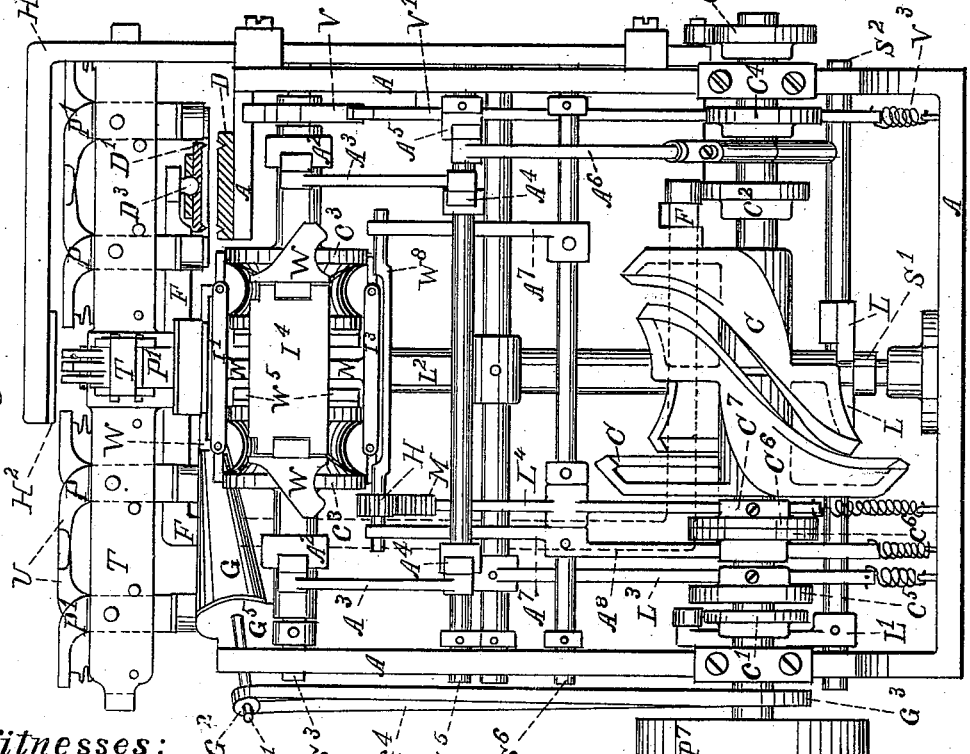
Figure 7:
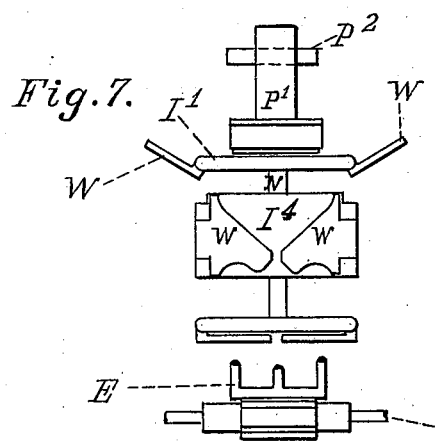
Figure 6:
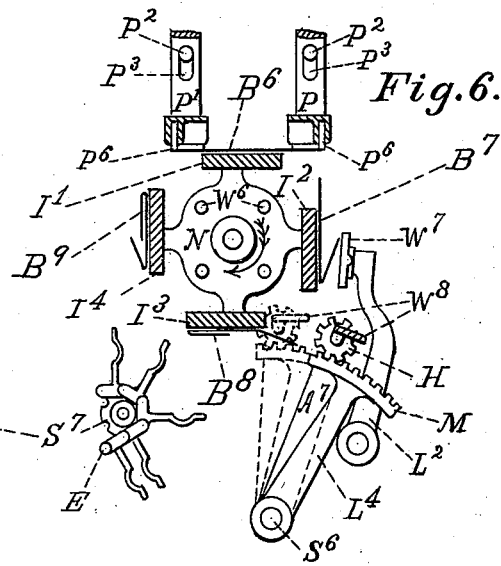
Figure 9:
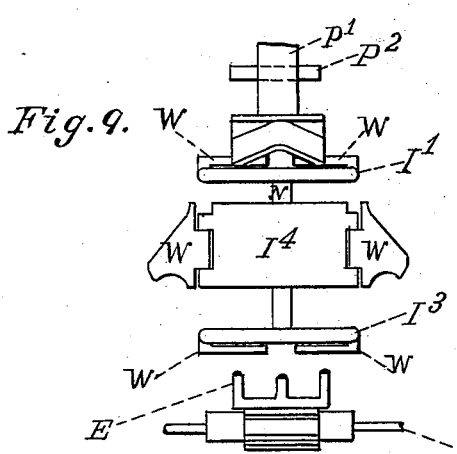
Figure 8:
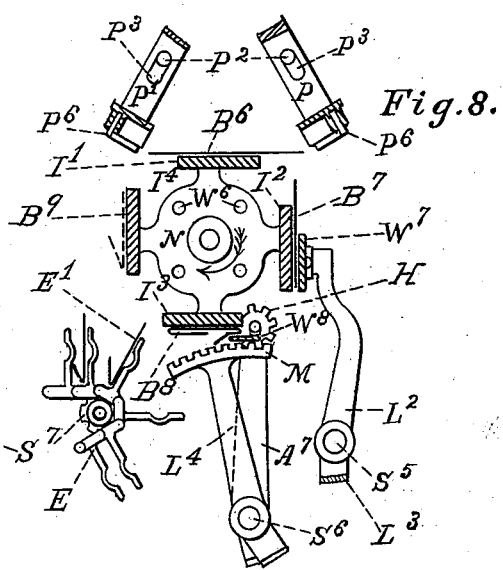
Figure 16:
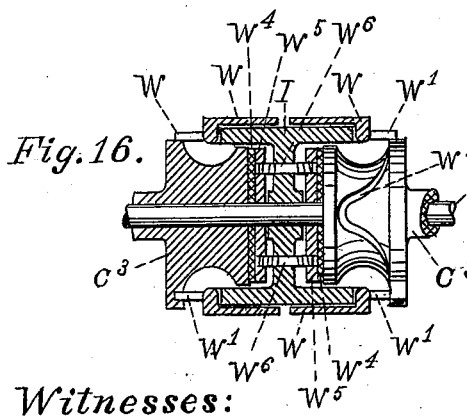
Figure 17:
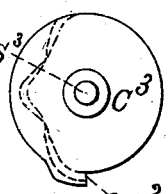

In the drawings, Figure 1 is a plan view of a machine embodying my improvements. Fig. 2 is a front elevation of the same. Fig. 3 is an elevation of the side at the left hand in Fig. 1. Fig. 4 is a rear elevation. Fig. 5 is a vertical section near the center of the machine, as seen from the right hand in Fig. 4. Fig. 6 is a view of a part of Fig. 5, showing the details in a different position. Fig. 7 is a view in projection of some of the parts shown in and as seen from the left hand of Fig. 6. Fig. 8 is a repetition of Fig. 6 with the parts in a different position. Fig. 9 is a view in projection of some of the parts shown in and as seen from the left hand of Fig. 8. Figs. 10, 11, 12, and 13 are views, reduced in size, of a part of Fig. 1, showing the said parts from several positions for the purpose of illustrating the progress of an envelope-blank through some of the steps of its manufacture into a completed envelope. Fig. 14 is an enlarged plan view of the back-flap-folding wing. Fig. 15 is a transverse section near the middle of the same. Fig. 16 is a vertical elevation, mostly in section, of a part of the folding mechanism; and Fig. 17 is an end view of cam $C^3$, drawn in projection with the view of the same part in Fig. 16.

Similar letters refer to similar parts throughout the several views.

In these views A is the frame-work of the machine, which consists of a base, two (side) uprights, a front, and two shelves, one for the lower creasing-die and one for carrying the blank-supporting mechanism. It also has bearings of the usual description for the several shafts, slides, and other operating parts.

S is the driving-shaft of the machine, which has a pulley, $P^7$, whereby it is rotated, and carries a pulley, an eccentric, and the principal cams of the machine.

S' is a vertical shaft for carrying and operating the picker-turret. This shaft has an intermittent rotary motion in the direction of the arrow which is next to it in Fig. 1, turning in this instance ninety degrees at each movement, and a vertically-reciprocating motion during the interval between the rotary movements. These motions are both obtained by means of the "mechanism for converting motion" for which Letters Patent of the United States No. 286,225 were granted to me October 9, 1883, to which reference may be had.

The principal parts herein, besides shafts S and S', which are shown in said patent, are as follows: cams C and C', Figs. 2, 4, and 5, rock-shaft $S^2$, levers L and L', and arms A'.

T is the picker-turret, which is a frame—in this instance four-armed, because the shaft S' has four movements to each revolution—fixed to the top of shaft S', of any suitable construction, adapting it to carry a pair of pickers in each arm. This turret is shown in section in Fig. 5, and its arms are lettered, respectively, T', $T^2$, $T^3$, and $T^4$, in Figs. 10, 11, 12, and 13, which figures each show the said arms in a different position, as hereinbefore described.

P and P' are respectively the inner and outer pickers of the several pairs of them which are carried in the picker-turret, and when referred to collectively are hereinafter generally called "pickers P." These pickers are arranged in pairs which are set radially to the axis of turret T, and to have a vertically-reciprocating and oscillating motion upon pins $P^2$, which pins are fixed in the picker-turret and extend through slots $P^3$, Fig. 6, in the pickers, as shown best in Figs. 5, 6, and 8. This oscillating motion, which, together with the reciprocating motion, is produced by means hereinafter described, is limited in one direction by stops P⁴, Fig. 5, against which stops the pickers are swung by springs P⁵, Fig. 5, which also draw them downward until the top of the slots P³ rest on pins P², as shown in said Figs. 5 and 6. These pickers have usually, and as herein shown, their gum-receiving surfaces formed on india-rubber strips P⁶, of proper shape and size, which are inserted into or clamped onto their lower ends (see Figs. 5, 6, and 8) in any convenient manner.

B represents a pile of blanks as placed upon a blank-supporting table, B', stationed at the front side of the machine. This table has a pendent rack, B³, which is operated by means of a pinion, B⁴, that is rotated by hand by means of hand-wheel B⁵ and by power automatically, by means of a suitable mechanism, (not shown,) which may be substantially such as described in United States Patent No. 221,835, dated November 18, 1879, or No. 284,483, granted to me September 4, 1883, to which reference may be had. Vertical fixed guides B² are placed in the usual manner, to keep the blanks in the proper position laterally as they are fed upward to the pickers.

When, in the operation of the machine, an envelope-blank is taken up by the pickers from the pile of blanks, it is then carried to a blank-folding-line-creasing mechanism stationed at the left-hand side of the machine. This mechanism consists of a lower die, D, which is grooved, and upper die, D', formed to fit the lower one, and devices for operating them. The lower die, D, is supported upon a portion of the frame in any convenient manner. The upper die, D', is carried upon one end of a vertically-reciprocating frame, F, being preferably connected thereto by a universal joint, D³, as shown, to permit said upper die to readily and exactly conform to the lower die, which extends from said die D' in a circular arc concentric to shaft S', over the pile of blanks and underneath the picker-turret, as in Fig. 1, then downward and to the left, as in Fig. 2, and then backward to the top of cam C², Figs. 2 and 4, as shown by dotted lines, Fig. 3. The cam C² acts to lift the said frame, and thereby the upper die, and a spring (not shown) to draw them down again whenever their weight is not sufficient to properly crease the blanks.

The construction of these parts may be modified, if desired, so as to reverse the operation of this cam.

As shown in the drawings, the aforesaid dies are constructed to only make a crease in the envelope-blank at its folding lines; but they may be constructed to make other lines or figures on other parts of the blank at the same time. This result may be accomplished by forming the desired lines or figure on the dies in the ordinary manner, as shown, for instance, in the United States patent to Goodale, No. 13,647, dated October 9, 1855.

G is a gum-delivering roll, which is preferably made conical, and so placed in the machine that its upper surface coincides substantially with the plane of the under surfaces of pickers P, and preferably so that its axis at the apex of the cone intersects the axis of shaft S' in the said plane. It is made to revolve simultaneously and uniformly with the pickers by any convenient means, which in this instance consists of pulley G² on its shaft G', belt G⁴, and driving-pulley G³ on shaft S. This roll is supported in bearings formed on the gum-dish G⁵, of the usual construction, and having the usual appliances for spreading the gum evenly upon the surface of the roll.

As described herein, the roll G is driven continuously; but it may be driven from shaft S' by means of suitable gearing, in which case it will revolve intermittently in unison with that shaft. This I intend to describe and claim in another application to be filed hereafter.

When the pickers have been gummed, have taken up an envelope-blank, and have carried the same to and between the creasing-dies, they then carry said blank and deliver it to a suitable blank-folding mechanism, which mechanism, as shown in this application, is constructed as follows:

N is a disk or wheel, which is provided with four folding-beds, I', I², I³, and I⁴, referred to collectively as "folding-beds I," and individually, without choice, as "folding-bed I," adapted to have envelopes folded thereon, each of which has at and hinged into each end thereof an end folding-wing, W, having arms W', Fig. 16, which are operated by the grooves W² (shown in Figs. 16 and 17) of the cams C³, which cams are formed concave and with grooves W², substantially as shown herein and in United States Patent No. 296,353, granted to me April 8, 1884. This wheel N is fixed centrally upon an intermittently-rotating shaft, S³, and the cams C³ are fitted to oscillate on said shaft upon either side of said wheel. Between these cams C³ and the wheel N is placed any suitable friction device, whereby the rotation of the said cams will tend to turn also the said wheel. This friction device consists in this instance of leather washers W⁴, disks W⁵, and screws W⁶ for spreading said disks against said washers, and thereby producing the required friction. (See Fig. 16.) These screws, by passing through holes in wheel N, Figs. 6, 8, and 16, operate to turn said wheel.

There are a variety of well-known friction devices suitable to use in place or instead of the one here described, V is a stop-wheel, which is rigidly fixed to shaft S³, for the purpose of preventing the friction device from turning it and the wheel N, except at the proper time and in the proper direction.

V' is a stop-lever, which is adapted to enter the notches of the stop-wheel, and is pivoted to the frame at V², Fig. 3, being operated in one direction by cam C⁴ and in the other by spring V⁴.

A² are arms fixed to the hub which extends outward from cams C³, and are connected by rods A³ to arms A⁴ of rock-shaft S⁴. This shaft has another arm, A⁵, which is connected by means of eccentric-rod A⁶ to eccentric A⁹, Fig. 3.

The operation of this device to operate the cams C³, as described, and by means of those cams the wings W, will now be readily understood.

S⁵ is a rock-shaft, which supports the arm L², carrying at its upper end the back-flap folding-wing W⁷, and which has an arm, L³, by which it is operated from the cam C⁵. To the back of this folding-wing the flexible piece Q, (as shown a thin steel plate reaching across a recess or depression in said wing,) is secured by means of screws J', and to this piece a stud, R, is usually fastened by means of rivets or screws J, for convenience in holding the said wing to arm L²; but this piece may be fixed directly to said arm. When the piece Q is not of itself strong enough to properly resist the pressure of the arm, a bearing-point, R', may be formed on the wing between it and said piece to receive the pressure without materially affecting its flexibility. This construction allows this folding-wing to properly conform to the folding beds I. Upon the front of this folding-wing a strip, K, is adjustably secured for adjusting the thickness to which the edge of the envelope shall be folded. The adjustment of this strip is effected by means of the pushing-screws J² and the holding-screws J³. Other well-known means may be used in place of these screws, if desired—as, for instance, a wedge behind the said strip. At the opposite edge from strip K of the wing W⁷ is placed a strip of elastic, flexible, and compressible material, K², for obtaining a more uniform and perfect pressure upon the gummed surfaces of the blank in the folding operation. In order to protect this strip from gum and injury, and to secure a better working-surface therefor, it is covered with a thin cover, K', preferably of metal, which is sufficiently flexible not to prevent the proper operation of said strip.

S⁶ is a rock-shaft supporting the seal-flap-folding mechanism, and is operated by an arm, A⁸, from cam C⁶. This shaft has two arms, A⁷, fixed thereon for carrying the oscillating seal-flap folder W⁸. H is a pinion, which is fixed on the said folder, and which is oscillated by means of a toothed segment, M, formed on lever L⁴, which lever is operated by cam C⁷. These parts are shown best in Figs. 4, 5, 6, and 8, by means of which their operation will also be readily understood. The mechanism operating said seal-flap folder constitutes the subject-matter of a separate application to be filed for an improvement in mechanical movement.

S⁷, Figs. 6, 7, 8, and 9, is an intermittently-revolving shaft carrying one end of the endless apron E. This apron and that shaft are both of the usual construction, and are operated in the usual manner.

H' is a vertical slide, which is supported in suitable bearings, and is operated by cam C⁸, and which extends over the pickers at the back of the machine, terminating in a presser, H². This presser is adapted to act at the proper time upon the arms U, Fig. 5, of the pickers P, to swing them outward at their lower ends, as shown in Fig. 8.

It will be understood that any parts not particularly described, and which relate to the usual operations of envelope-machinery, may be made in any way suitable to effect the desired result. Thus the several cams C' to C⁸, both inclusive, may be so constructed and arranged as to act upon the slides and levers in either one or in both directions of their motion, springs or other devices equivalent thereto being used whenever required.

Figures 10, 11, 12, 13:
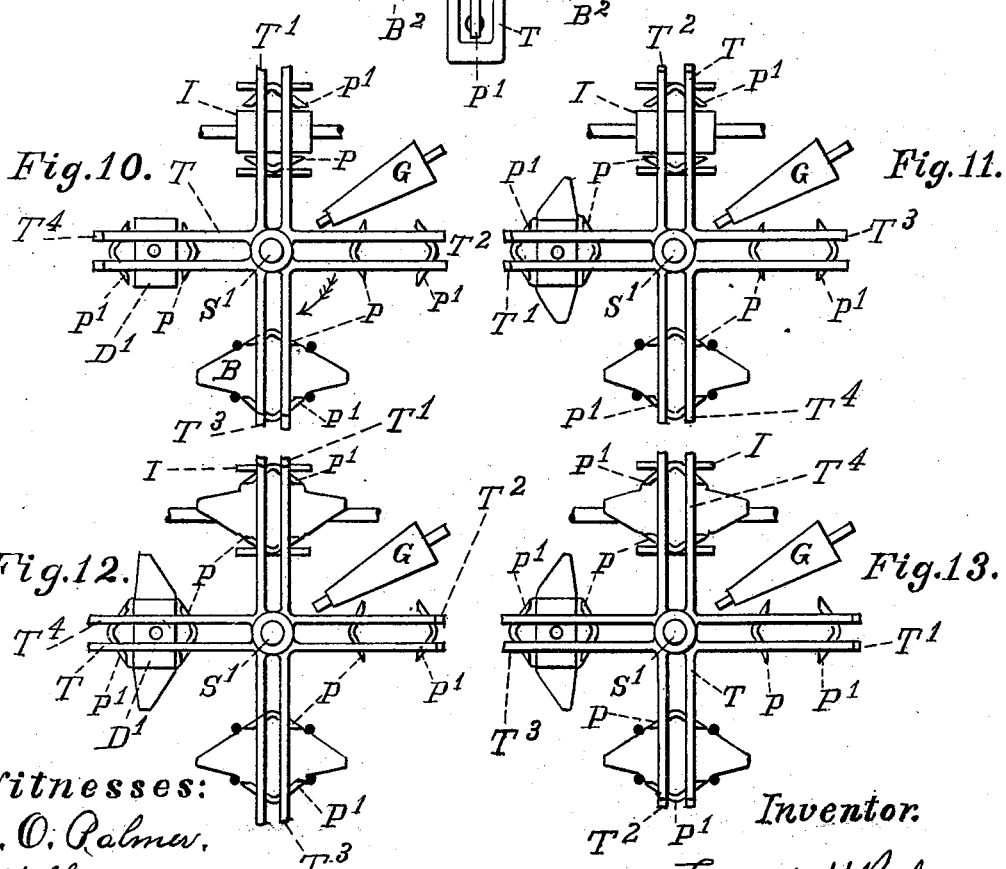

The operation of my improved envelope-machine is as follows: A pile of blanks, B, which have been previously cut to the required shape and size, are placed upon table B' between guides B² and the blank-feeding devices set to properly feed up the said table. The gum-box G⁵ is properly supplied with suitably-prepared gum, and the gum-spreading appliances adjusted to the required working position. The picker-turret with its four arms, T' T², T³, and T⁴, pickers P, folding-bed I, gum-roll G, creasing-die D', and blank pile B now stand in the position shown in Fig. 10. The machine being now started, the shaft S' is raised by cam C' and the intermediate mechanism described until the lower surfaces of the pickers are level with the top of roll G, somewhat higher than in Fig. 5, and the said shaft revolved in the direction of the arrow in Fig. 10 until the turret has been turned one-half revolution, and the arm T' stands in the position of arm T⁴, as shown in Fig. 11. This requires two revolutions of the cam-shaft S, and by passing them over the gum-roll G in contact therewith applies gum to the pickers of arms T' and T⁴. After arriving at that position the pickers are lowered by cam C' until the lower surfaces of those in arms T², T³, and T⁴ are level, or nearly so, with the top of folding-bed I', or slightly lower than in Fig. 5, and those in arm T' rest upon the pile of blanks B, adhering firmly to the uppermost blank. The continued operation of the machine then lifts all the pickers and the blank adhering to those in arm T', the turret is rotated to the position shown in Fig. 11, with the blank at arm T' resting beneath the die D' and the pickers of arm T⁴ upon the blank-pile B. During this rotation of the turret the pickers of arm T³ pass over and receive gum from the roll G. While the turret is in this position, and with a movement corresponding in time thereto, the upper creasing-die, D', is, by means of cam C² and the intermediate mechanism described, brought down upon the lower die, creasing the blank in its folding lines, and is then immediately raised to its former position. At the next revolution of the machine the turret is again lifted, turned through one-fourth of a circle, and lowered, carrying the blank at arm T' onto the folding-bed I', (see Fig. 6,) the blank at arm T⁴ between the creasing-dies gumming the pickers in arm T², and resting those in arm T³ upon the blank-pile. This position is shown in Fig. 12, and these operations are repeated with each succeeding revolution of the machine, so that each arm of the turret in succession first receives gum from roll G, then takes up a blank from pile B, next conveys said blank between the creasing-dies, and finally to the uppermost folding-bed of the series. The following revolution brings these parts to the position shown in Fig. 13, which is similar to Fig. 12. When a blank, B⁶, Fig. 6, arrives at and is lowered upon the upper folding-bed, I', and while still adhering to the pickers, as shown in said figure, the continuing operation of the machine, acting through the cams C³, the grooves W² thereof being properly formed therefor, closes the end folding-wings W of the folding-bed I' from their position in Fig. 7 to their position in Fig. 9, thereby folding end flaps of the blank at the creased folding lines down upon the central portion of said blank, and with sufficient pressure to firmly hold the now partially-folded blank onto the said folding-bed. The end wings being closed the pickers immediately begin to rise, and at the same time the presser H² is brought down upon the arms U, swinging the pickers from their position in Fig. 6 to their position in Fig. 8. This withdraws the gummed surfaces of the pickers from the back flap and seal-flap by a sliding motion, whereby the gum is smoothly "laid" or distributed upon the proper portions thereof, rubbing out any air-bubbles which may have existed in the gum solution, and rendering any "foaming" of the said solution much less troublesome then formerly. The folding-beds, the end wings continuing closed, are now revolved in the direction of the arrow one-fourth of a revolution, during which motion the back flap, which is at the right hand, at B⁶, Figs. 6 and 8, is pushed up by the back-flap folder W⁷ until it stands as at B⁷, Fig. 6. This folder is then pressed backward toward the left hand onto the folding bed at I², as shown in Fig. 8, folding down the back flap onto the end flaps and sticking it firmly to them, when the said folder is returned to its position in Fig. 6. While this operation is performing another blank is placed upon the folding-bed at I', as above described. The folding-beds are now revolved, as before, bringing the partially made envelope from B⁷ to B⁸, with the seal-flap at the right hand. During this motion the seal-flap folder W⁸ stands in the right-hand one of the two positions in which it is shown in Fig. 6, and on the completion of said motion of the folding-beds it is, together with segment M, moved backward to the left-hand position there shown, standing above the said seal-flap. The arms A⁷, and, of course, the axis of the folder W⁸, now stand at rest while the motion of the arm L⁴ and its segment M is continued, revolving the pinion H, and thereby said folder until these parts stand as in Fig. 8, and the seal-flap is properly folded, substantially as there shown, thereby completing the envelope. The said parts L⁴, M, A⁷, H, and W⁸ are then returned to their positions in Fig. 6. During this operation the back-flap folder operates upon the partially-folded blank at B⁷, and a third blank is placed upon the folding-bed I'. The folding-beds are now again revolved, as before, bringing the completed envelope from B⁸ to B⁹, and immediately the return motion of the oscillating cams C³, owing to the proper construction of its groove W² therefor, opens the closed end wings W of the folding-bed at I⁴, (see Fig. 9,) and the envelope falls into a "pocket" at E', Fig. 8, of the endless apron E, being afterward disposed of in the usual manner. During these operations an envelope has been completed at B⁸, another one partially made at B⁷, and another blank partially folded at B⁶, as hereinbefore described. Each operation having now been accomplished, they may all be continued simultaneously so long as desired.

I do not limit myself to a series of four folding-beds, nor to that series arranged to be revolved about an axis, for a different number may be used, and they may be moved in a circuit not a circle, as when arranged, for instance, in the form of an endless chain or belt and adapted to run over two or more wheels. Neither is it necessary when they do revolve about an axis that they shall be parallel thereto; but they may be arranged at an angle thereto, and to be rotated about an inclined or about a vertical axis, as may be preferred, corresponding modifications being made, of course, in other parts of the machine.

The pickers P are shown and described herein as being carried in a circular circuit, because that is considered the most convenient way of operating them; but they may be arranged in a circuit not a circle, if preferred, corresponding modifications being made in the arrangement or in the construction, or in both, of the other parts of the machine.

The use of the presser H² is not necessary to the operation of my improved envelope-machine, as by making the vertical motion of the turret T sufficiently great the pickers may be withdrawn from the blank without their aid; but I consider the said presser and the swinging motion of said pickers as very useful in securing the desired quality of the gumming.

The combination of the folding-beds, each having a wing or arm pivoted therein, the cam operating the said arms, and mechanism actuating said beds and cam constitutes the subject-matter of a separate application to be filed for an improvement in mechanical movement.

The method in general by which the mechanisms comprised in this machine operate to make an envelope-blank into a completed envelope is similar to one which I have described in another and prior application for Letters Patent of the United States, Serial No. 118,905, filed January 28, 1884. The particular method by which the said mechanisms operate in my present invention is an improvement upon or an extension of the method therein described, being substantially the same as that until the blank reaches the folding mechanism, after which it is as hereinbefore described. By this method—the present one—the blank is taken up from the pile of blanks by the gummed pickers, conveyed while adhering to said pickers to and between the creasing-dies, and from said dies onto the folding-bed, where it is first secured and the pickers afterward withdrawn therefrom, so that the position of the envelope-blank is at all times during its manufacture positively controlled.

This machine is adapted to be used for making that kind of envelopes which have no gum on their flaps, but which are secured by a "tuck," by using blank-carrying pickers operating to lift blanks by suction in the well-known manner, in which case obviously the gum-delivering mechanism may be dispensed with or left unused.

It should be understood that in the combination specified in claim 20 I am not limited to the use of a particular folding mechanism further than it shall operate as an element of the combination and properly fold the blanks delivered to it. It should also be understood that the terms "gum-delivering," "blank-supporting," "blank-creasing," and "blank-folding" mechanism include not only the parts which act directly in making an envelope, but also some well-known means, substantially as set forth, for operating said parts.

Having thus described my invention, I claim—

1. The combination of a picker-turret, a gum-roll, and a series of pickers supported in said turret and carried thereby over and in contact with said roll, substantially as described.

2. The combination of a series of traveling pickers, means, substantially as described, for supporting and moving said pickers in a circuit, and gum-delivering mechanism, substantially as described, for putting gum onto said pickers while they are traveling in said circuit, substantially as set forth.

3. The combination of a revolving turret, one or more pairs of pickers supported on said turret, and a conical gum-roll, the apex of which coincides substantially with the axis of said turret, substantially as described, and for the purpose set forth.

4. The combination of turret T and the swinging pickers P and P', arranged in pairs which are set in said turret radially to the axis thereof, substantially as described.

5. The combination of a turret, T, having pickers arranged in two concentric circles, and the creasing-die D', arranged to be supported and operated between said circles, substantially as described.

6. The combination, with the turret and its pickers, arranged in pairs set radially, as described, of the die D', a frame, substantially as shown and described, for carrying said die, and actuating mechanism, substantially such as described, for imparting to said frame and die a reciprocating motion, substantially as set forth.

7. The combination of the pickers P P', having arms U, a presser, $H^2$, and means, substantially as described, for operating said presser, substantially as set forth.

8. The combination of a picker-holding turret, pickers P and P', pivotally supported in said turret, and springs connected to said pickers for holding them in position, substantially as described.

9. The combination of a series of blank-taking traveling pickers and a series of blank-receiving traveling folding-beds, substantially as described.

10. The combination of shaft $S^6$, arms $A^7$, folder $W^8$, having pinion H, lever $L^4$, having segment M, and cams $C^6$ and $C^7$, substantially as described.

11. The combination of a folding-bed, as I, end-flap folding-wings W, pivoted to the ends of said bed, and cam $C^3$, having cam-groove $W^2$ operating said wings, substantially as described.

12. The combination of shaft $S^3$, a series of folding-beds carried on said shaft, shaft $S^5$, an arm or lever carried on said shaft $S^5$, and a folding-wing carried on said arm by a flexible connection, substantially as described, to operate against said beds, substantially as described.

13. The combination of shaft $S^3$, folding-beds carried on said shaft, shaft $S^6$, the oscillating seal-flap folder $W^8$, carried in arms on rock-shaft $S^6$, and means, substantially as described, for operating said folder to fold the flaps of envelope-blanks on said beds, substantially as set forth.

14. The combination of a series of folding-beds moving in a circuit, end flap folding-wings moving with said beds in said circuit, a back-flap folder arranged to operate upon a folding-bed at one point in said circuit, and a seal-flap folder arranged to operate upon a folding-bed at another point in the circuit, substantially as described.

15. The combination of an arm, a folding-wing, and a flexible piece connecting said wing to said arm, substantially as described.

16. The combination of an arm, a folding-wing, a flexible piece connecting said wing and arm, and a bearing-point for sustaining said flexible piece against the pressure of said arm, substantially as described.

17. The combination of a folding-wing, elastic strip $K^2$, and flexible cover K', substantially as described.

18. The combination of the rotary reciprocating cams $C^3$, folding-bed disk N, friction devices, substantially as described, between said cams and said disk, shaft $S^3$, stop-wheel V, lever V', and cam $C^4$, substantially as set forth.

19. In an envelope-machine, the combination of one or more pickers arranged to move about an axis, a gum-delivering, a blank-supporting, a blank-creasing, and a blank-folding mechanism, each substantially as described, and arranged in a circle around said axis, and mechanism, substantially as described, adapted to first pass said pickers over the gum-delivering mechanism, next to pass it to and stop it at the blank-supporting mechanism, then to the blank-creasing, and then to the blank-folding mechanism, all arranged substantially as set forth.

20. The combination, in an envelope-machine, of devices to support the blanks, mechanism to fold envelope-blanks, with mechanism arranged between the blank-supporting devices and the folding mechanism to crease the blanks prior to folding, and with an intermittingly-acting non-retreating blank-carrying picker to take the blank from its supporting devices and carry it to the creasing-dies, and when creased to carry it to the folding mechanism, substantially as described.

21. The combination, in an envelope-machine, of a folding-bed, an end-flap folding-wing at each end of said bed, a blank-picker constructed to hold an envelope-blank by its side flaps, and mechanism, substantially as described, operating said carrier and wings to first present a blank so held onto said folding-bed, then to close said wings to fold the end flaps and hold the blank onto said bed, and then to withdraw the carrier from the side flaps, substantially as set forth.

FRANCIS H. RICHARDS.

Witnesses:
C. O. PALMER,
H. W. FAULKNER,
H. F. L. ORCUTT.